(No Model.)

C. MILLER.
GRAIN BINDER.

No. 340,342.  Patented Apr. 20, 1886.

Fig. 1.

WITNESSES:
Fred. G. Dieterich.
Wm. Bagger.

Charles Miller,
INVENTOR.
by Louis Bagger & Co.
ATTORNEYS.

(No Model.)  6 Sheets—Sheet 4.

C. MILLER.
GRAIN BINDER.

No. 340,342.  Patented Apr. 20, 1886.

WITNESSES:
Fred. G. Dieterich
Wm. Bagger

Charles Miller,
INVENTOR.

by:  Louis Bagger & Co.,
ATTORNEYS.

N. PETERS. Photo-Lithographer, Washington, D. C.

(No Model.)

C. MILLER.
GRAIN BINDER.

No. 340,342. Patented Apr. 20, 1886.

Fig. 6.

WITNESSES:
Fred G. Dieterich
Wm. Bagger

Charles Miller,
INVENTOR.
by: Louis Bagger & Co.,
ATTORNEYS.

UNITED STATES PATENT OFFICE.

CHARLES MILLER, OF AUBURN, NEW YORK.

GRAIN-BINDER.

SPECIFICATION forming part of Letters Patent No. 340,342, dated April 20, 1886.

Application filed April 1, 1885. Serial No. 160,888. (No model.)

*To all whom it may concern:*

Be it known that I, CHARLES MILLER, a citizen of the United States, and a resident of Auburn, in the county of Cayuga and State of New York, have invented certain new and useful Improvements in Grain-Binders; and I do hereby declare that the following is a full, clear, and exact description of the invention, which will enable others skill in the art to which it appertains to make and use the same, reference being had to the accompanying drawings, which form part of this specification, and in which—

In several of the figures parts have been broken away for the purpose of illustrating the construction more clearly; and corresponding parts in all of the figures are denoted by the same letters of reference.

Figure 1:
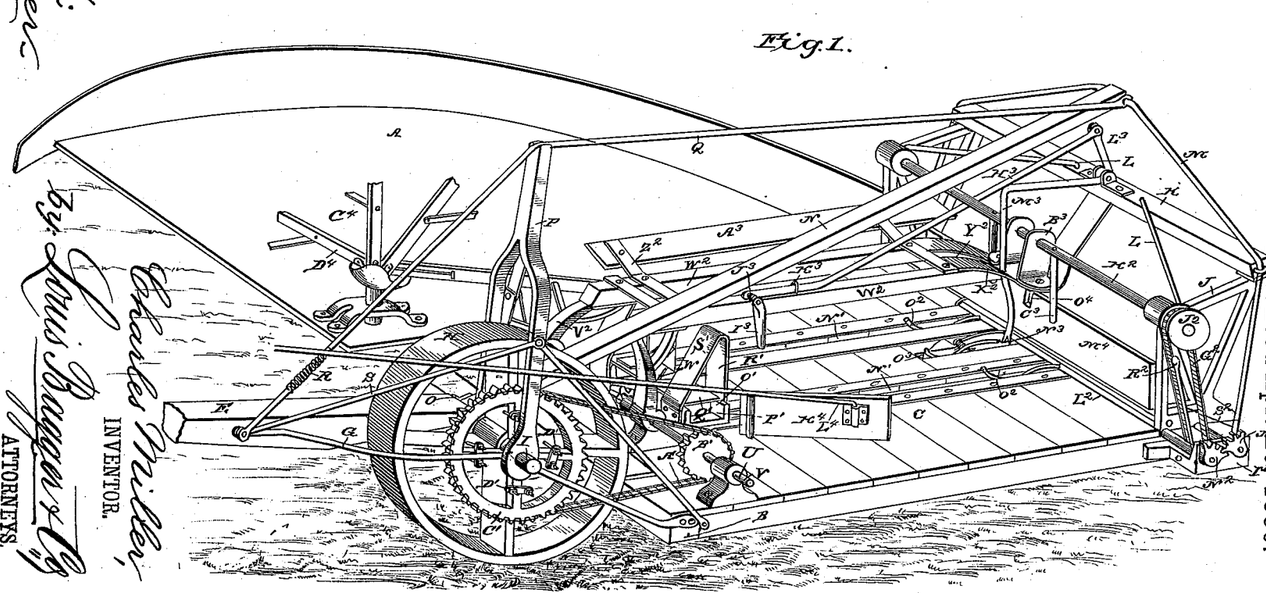
Figure 1 is a perspective view of my improved grain-binder, and as much of the harvester to which it is attached as is necessary to illustrate its arrangement and operation.
Figure 2:
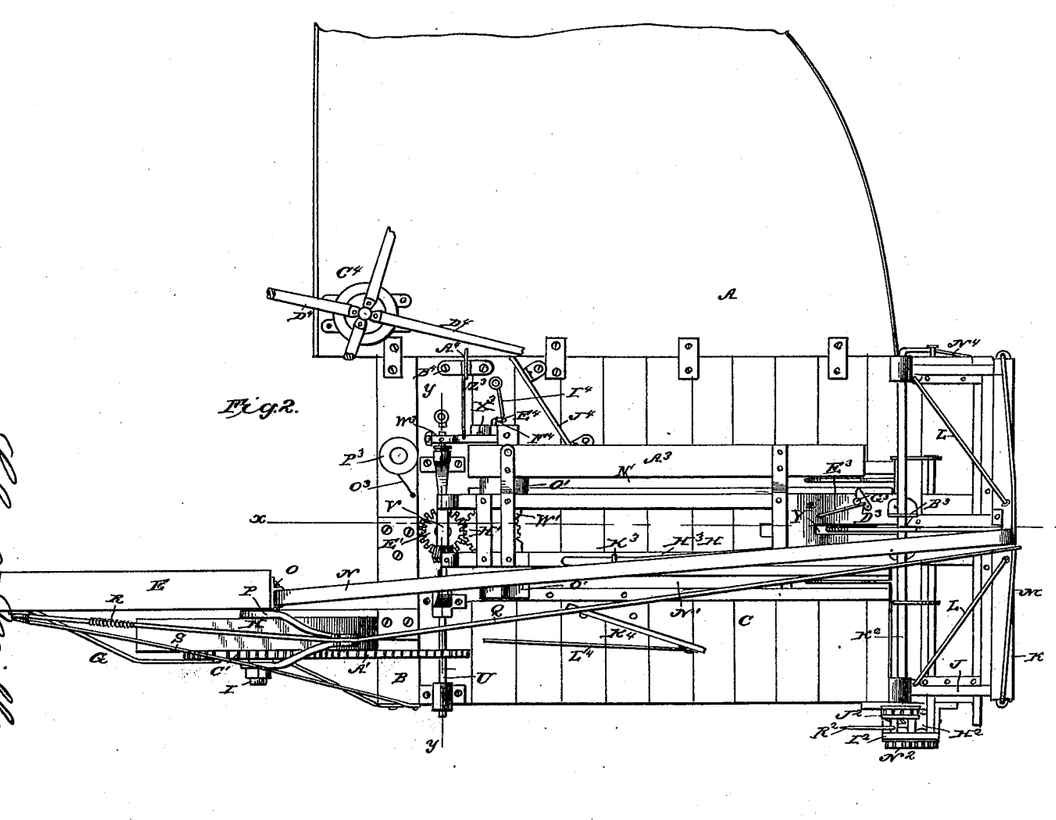
Fig. 2 is a top view of the same.
Figure 3:
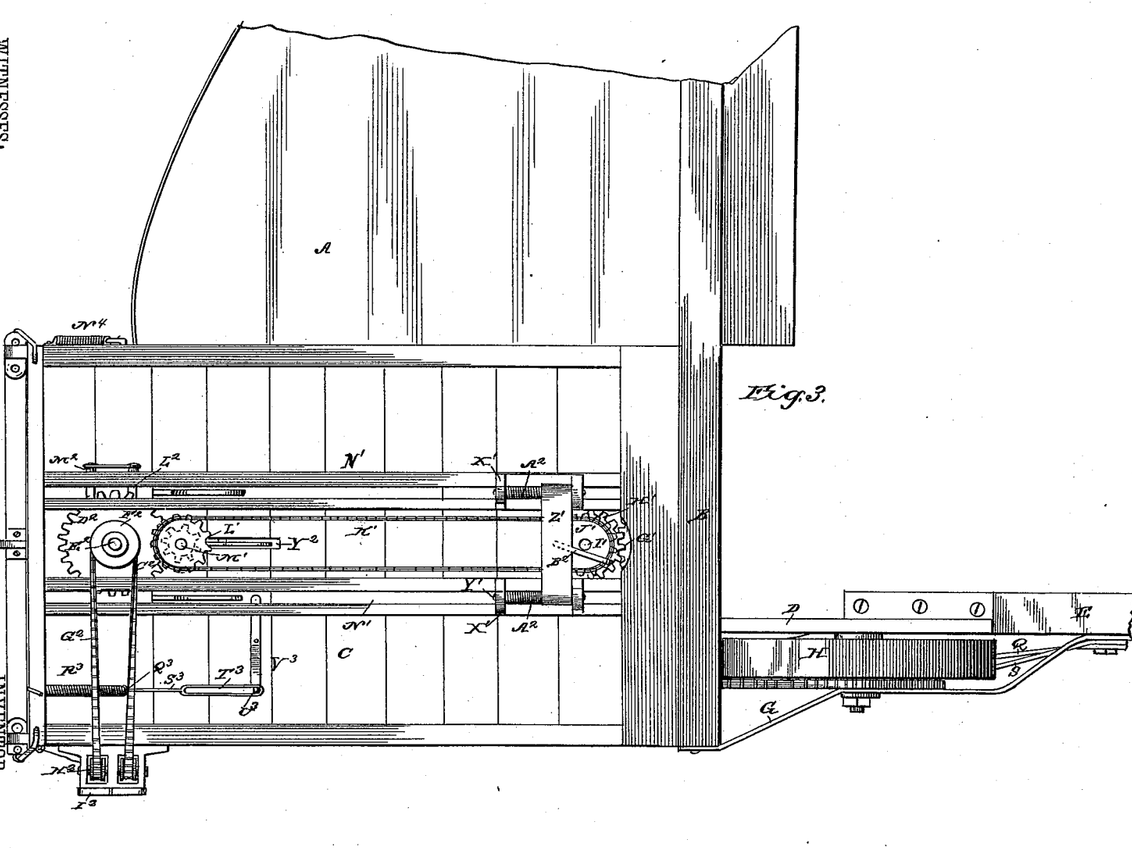
Fig. 3 is a bottom view.
Figure 4:
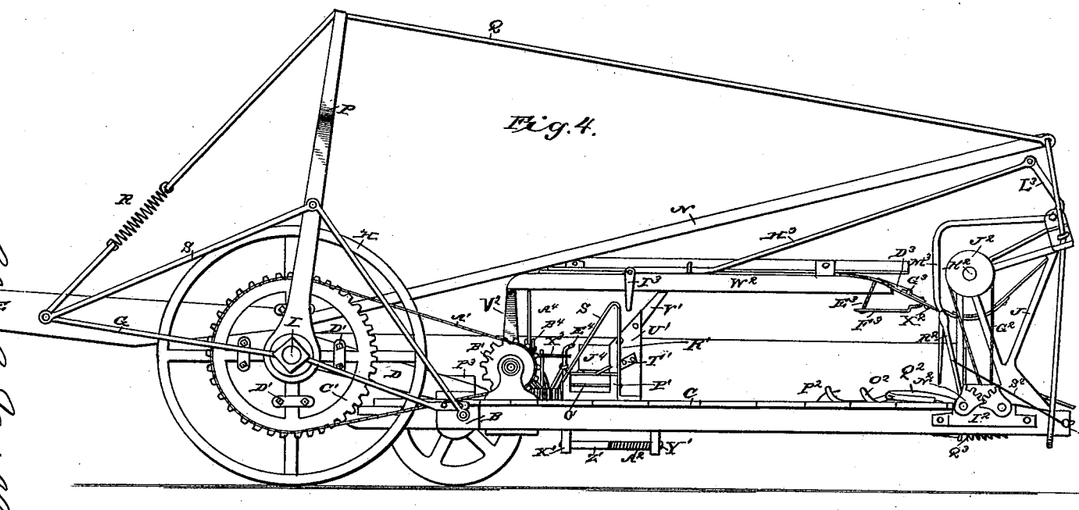
Fig. 4 is a side elevation.
Figures 5, 7, 8:
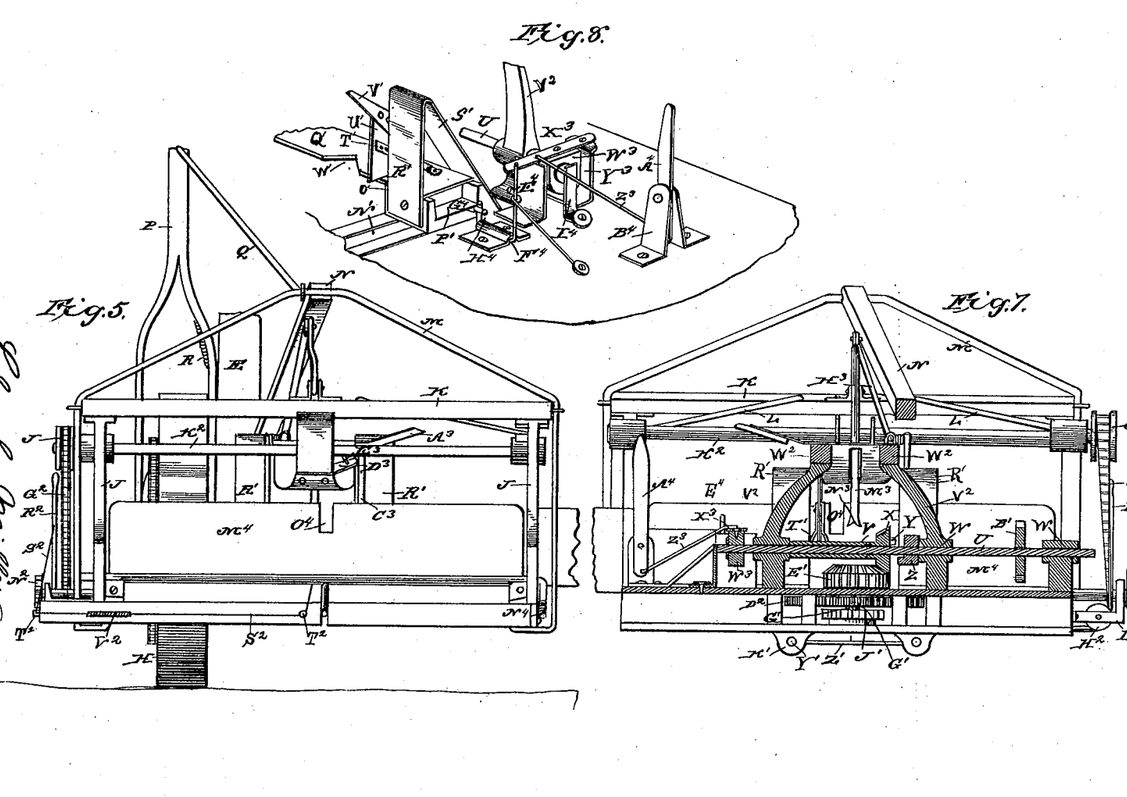
Fig. 5 is a rear elevation.
Fig. 7 is a vertical transverse sectional view taken on the line *y y* in Fig. 2.
Fig. 8 is a perspective view of part of one of the sliding grain-carriers with part of the tripping mechanism.
Figure 6:
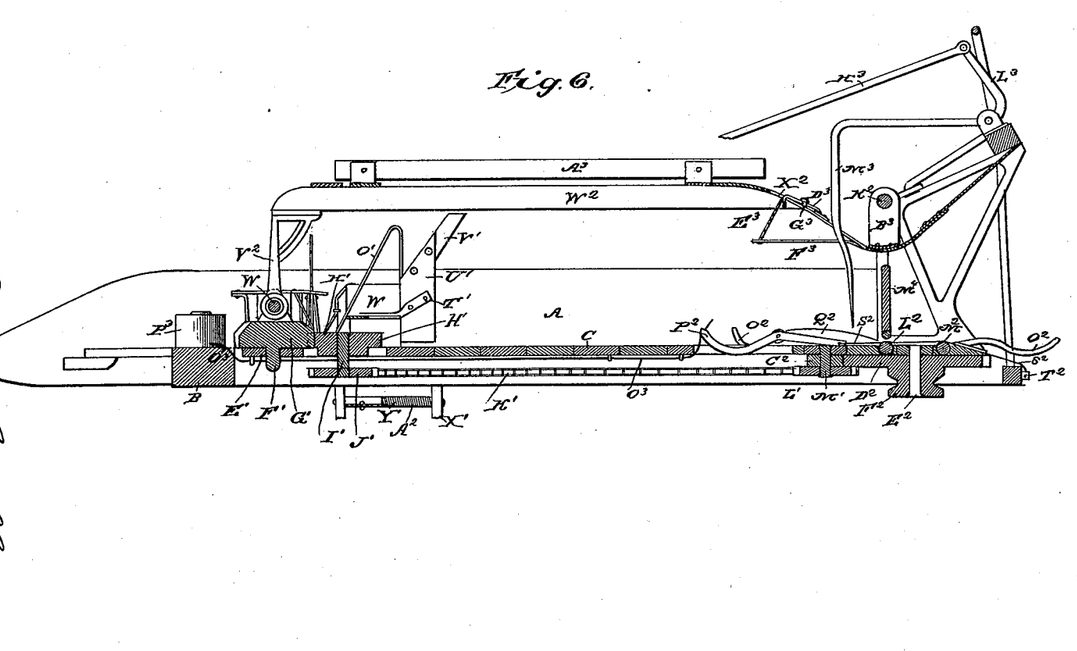
Fig. 6 is a longitudinal vertical sectional view, taken on the line *x x* in Fig. 2.

This invention relates to that class of grain-binders which is known as "low-down" binders, and in which the grain-binding mechanism is about on a level with the reaper-table, in order to avoid the lifting of the grain above the level of the said table; and it has for its object to produce a grain-binder of this class which shall possess superior advantages in point of simplicity, durability, and general efficiency.

With these ends in view the invention consists in the improved construction, arrangement, and combination of parts, which will be hereinafter fully described, and particularly pointed out in the claims.

In the drawings hereto annexed, A designates the reaper-table, to the under side of which, near the front edge, is bolted or otherwise secured a beam, B, extending laterally from the edge of the same.

C is the binder platform, which is secured, in any suitable manner to the edge of the reaper-table and to the beam B, which latter supports the front edge of the said binder-platform.

D is a metallic bracket, secured to the upper side of the beam B, and E is the tongue, which is firmly bolted to the upper side of the front end of said bracket. Secured upon the front end of the tongue is a weight, F, serving to balance the weight of the binder, thereby promoting lightness of draft. The outer side of the tongue is connected with the outer end of the beam B by means of a stout iron brace, G.

H designates the drive-wheel, the axle of which, I, is mounted in the bracket D and brace G, which together serve to keep the drive-wheel at a proper distance from the front edge of the beam B.

Secured to the sides of the binder-platform, at the rear end of the latter, are a pair of brackets or frames, J J, of suitable construction, substantially as shown in the drawings hereto annexed. The upper rear ends of the said brackets are connected by a transverse beam, K, the central portion of which is connected by diagonal braces L with the upper front corners of the said frames or brackets M is a metallic truss, the sides of which are connected to the ends of the transverse beam K, whence they extend downwardly, and are connected or securely attached to the under side of the rear end of the binder-platform. The apex of the truss M is secured to the rear end of a longitudinal brace or stringer beam, N, the front end of which is connected to the rear end of the tongue E by means of a suitable hinge, O.

Mounted pivotally upon the axle I of the drive-wheel is a bifurcated metallic bracket, P, the upper end of which supports the apex of a truss, Q, the front and rear ends of which are connected, respectively, to the side of the tongue E and to the apex of the truss M. The front part of the said truss Q is made in two parts or sections, which are connected by a strong spring, R, which admits of an elastic or yielding motion taking place when the machine is passing over obstructions. A supplemental truss, S, the apex of which is secured to one side of the bracket P, has its front and rear ends attached, respectively, to the side of the tongue and to the front end of the binder-platform.

It will be seen that, by the construction and arrangement of parts thus far described, the frame of the machine is practically balanced upon the drive-wheel H, the rear end of the binder-platform being supported by the trusses Q and M, and the beam or stringer N serving to prevent the truss M from being pulled in a forward direction by the action of the truss Q. The outer end of the reaper-table is provided with the ordinary grain-wheel, T. By this construction and arrangement of parts a light and durable frame is secured, which is well balanced upon its supports and which presents no obstructions to the proper location of the operative parts of the machinery, which will be presently hereinafter described.

The binder-platform is provided at its front end with bearings for a transverse shaft, U, arranged to slide laterally in its bearings, and encircled for a portion of its length by a tubular shaft, V, which is journaled permanently in its bearings W W. The tubular shaft V is provided at one end with a pinion, X, having a clutch, Y, adapted to engage a clutch-collar, Z, upon the sliding shaft U. A rotary motion is transmitted to the latter by means of a chain, A', running over a chain-wheel, B', mounted upon the said shaft, and over a sprocket-wheel, C', secured upon the outer side of the drive-wheel H by means of clips D'. The pinion X of the shaft V engages a bevel-gear, E', mounted upon a vertical shaft, F', arranged in suitable bearings at the front end of the binder-platform. Shaft F' also carries a spur-wheel, G', meshing with a spur-wheel, H', upon a vertical shaft, I', arranged in rear of the said shaft F', and having at its lower end a chain-wheel, J', connected by a chain, K', with a chain-wheel, L', mounted upon a vertical shaft, M', in the binder-platform, near the rear end of the latter. It will be seen that the chain K', with its driving wheels, is arranged on the under side of the binder-platform. The latter is provided with two longitudinal parallel slots, N' N', affording bearings for the longitudinally-sliding grain-carriers O' O', consisting of H-shaped cross-heads P' P', arranged to slide longitudinally in the slots N', and having their upper ends connected by a cross-piece, Q'. The cross-heads P' are provided with uprights R', supported by inclined braces S', and the cross-piece Q' is provided with a rearwardly-extending bracket, T', carrying a vertical gatherer, U', the upper end of which is provided with a rearwardly-extending inclined arm, V', and which serves to gather the grain upon the binder-platform into a compact mass, which may be readily moved by the carriers O' to the bunching mechanism, which will be hereinafter described.

The rear edge of the cross-piece Q', connecting the carrier-slides, is provided with a notch, W', to admit of the passage of the needle and thread guide, as will be hereinafter described.

The under sides of the cross-heads P' are provided at their front and rear ends with downwardly-extending lugs X', in which are secured a pair of longitudinal bolts, Y', connected at their front ends by a transverse brace, Z', arranged to slide longitudinally upon the said bolts. $A^2$ $A^2$ are springs coiled upon the said bolts in rear of the cross piece or brace Z'. The latter is connected by a pivoted rod, $B^2$, with the drive-chain K', to which reference has hereinbefore been made, the said connecting-rod $B^2$ being so arranged as to clear the said drive-chain and the chain-wheels over which it runs. It will thus be seen that when the drive-chain is operated a longitudinally-reciprocating motion is imparted to the grain-carriers, which, by the construction described, are capable of moving longitudinally with relation to the cross-piece Q, by means of which they are connected with the drive-chain, so that they will yield when necessary, thus enabling greater or smaller quantities of grain to be carried to the bunching mechanism by the action of the said carriers.

The vertical shaft M' carries above the chain-wheel L' a pinion, $C^2$, meshing with a spur-wheel, $D^2$, upon a vertical shaft, $E^2$, journaled in rear of the shaft M'. Said shaft $E^2$ is also provided with a chain-wheel, $F^2$, over which runs a chain, $G^2$, passing over a pair of vertical guide-pulleys, $H^2$, journaled in a bracket, $I^2$, secured to the outer side of the rear end of the binder-platform, and over a chain-wheel, $J^2$, upon the end of a shaft, $K^2$, which is journaled in boxes or bearings at the upper front corners of the frames or brackets J J, at the rear end of the binder-platform. To the shaft $K^2$, which I denominate the "knotter-shaft," a rotary motion may thus be imparted from the drive-chain K' when the latter is driven to operate the grain-carriers, as hereinbefore described.

Journaled in suitable bearings near the rear end of the binder-platform are a pair of transverse shafts, $L^2$ and $M^2$, provided at one end with toothed segments $N^2$, so that when operated the said shafts shall rock or oscillate in opposite directions. The said rock-shafts are equipped with suitably-constructed curved arms $O^2$, serving, when the shafts are operated, to compress the grain bundle or gavel and to hold it in position while it is being operated upon by the binding mechanism. The forward one of the said shafts $L^2$ also carries the needle $P^2$, which is hinged or pivoted to an arm, $Q^2$, extending radially from the said shaft, thus permitting the needle to assume a position at nearly right angles to said arm, so that its point will readily enter the binding mechanism. The outer end of the shaft $L^2$ has an arm or lever, $R^2$, which is connected with the heel of the needle by means of a cord, $S^2$, passing through suitable eyes or guides, $T^2$, and provided with a spring, $U^2$, the functions of said cord being to keep the needle P² from doubling back upon the arm Q² after the sheaf has been bound and the arm Q² is turned down into its horizontal position. It may, however, be here stated that in the needle and the knot tying or binding mechanism proper no particular novelty is herein claimed, and I reserve the privilege of using any devices for these purposes which may be successfully operated in conjunction with the remainder of my invention. In the drawings, therefore, I have shown no parts of the binding mechanism, with the exception of the needle.

The bearings W of the shaft U, at the front end of the binder-platform, are provided with upwardly-extending brackets V², to which are secured a pair of rearwardly-extending horizontal beams, W², the rear ends of which are connected by a rearwardly-extending metallic plate, X², having a slot, Y², and the rear end of which is bolted or otherwise secured to the transverse beam K, supported upon the brackets J at the rear end of the platform. The beams W² are connected by cross-pieces extending laterally, so as to form brackets Z², to which is secured an inclined guide, A³, serving to guide the grain in under the beams W² when the machine is in operation.

The knotter-shaft K², in addition to its bearings in the brackets J, is provided with bearings in a pair of lugs, B³ B³, extending upwardly from the plate X², and on either side of the latter the said shaft is provided with a pair of radial rods, C³, serving to kick or eject the sheaf off the binder-platform after it has been bound. Pivoted to the plate X², and extending laterally from the same, is a latch, D³, having an inclined or beveled edge or end, and connected by a cord, E³, with a suitably-arranged spring, F³, by which it is forced in a forward direction until it engages a lug or stud, G³, upon the said plate X². The particular function of this latch will be presently more fully set forth.

One of the guide-beams W² is provided with bearings for a longitudinally-sliding rod, H³, the front end of which is provided with a downwardly-extending pivoted arm, I³, around the pivoting-pin of which is coiled a suitable spring, J³, engaging the said arm, and serving to hold or retain it in an approximately vertical position, while at the same time permitting it to move or swing in either a forward or a rearward direction by the application of proper force or pressure. This pressure is furnished by one of the grain-carriers O', which, when it strikes the arm I³, will move the rod H³ in a rearward direction until the said arm reaches one of the guide-eyes K³, when the said arm will yield and admit of the passage of the carrier O', which latter after traveling to the rear end of the binder-platform, and assisting in forming the gavel will, on its return, again strike the arm I³, and serve to return the rod H³ to its normal position, when the arm I³ will again yield and permit the carrier O' to pass under it to the front end of the binder-platform. The rear end of the rod H³ is connected pivotally with one end or arm of a bell-crank lever, L³, which is pivoted to the transverse brace or beam K, and the other arm of which has a downwardly-extending arm, M³, the lower end of which is bifurcated at N³, and serves as a guide for the binding-cord O³. The latter, which passes from a spool-case, P³, at the front end of the binder-platform, and after running through suitable guides through the eye of the needle, is by the action of the bifurcated arm M³ normally held down flat upon the binder-platform, while, when the carriers O' move rearwardly for the purpose of gathering the grain and forming the bundle, the said arm is raised by the mechanism described, thus enabling the grain to pass under it, and be properly encircled by the binding-cord.

The transverse shaft L², the compressing-arms of which, O², normally rest in the longitudinal slots N' of the binder-platform, is provided with a downwardly-extending radial arm, Q³, connected by a tension-spring, R³, with the rear end of the platform, said spring serving to keep the arms O² normally in a lowered position. Connected to the arm Q³ is a forwardly-extending link or rod, S³, having a slot, T³, through which passes a stud, U³, of a lever, V³, which is pivoted under the binder-platform, and one end or arm of which extends under one of the slots N', so as to be actuated by the carrier-slides when the latter move rearwardly upon the platform. The rearward movement of the said carriers will thus serve to actuate the rock-shafts L² and M², and cause the arms O² of said shafts to rise and compress the bundle and hold it in position until it has been bound by such mechanism as it may be deemed desirable to employ.

Journaled upon the shaft U, but secured to move longitudinally therewith, at the front end of the binder-platform, is a box, W³, which is connected pivotally with a lever, X³, which is pivoted to an upright, Y³. One end of the lever X³ is connected by a pivoted rod, Z³, with the lower end or arm of a vertical lever, A⁴, pivoted between suitable uprights or supports, B⁴, near the inner edge of the binder-platform.

C⁴ designates the rake, the arms of which, D⁴, as they move over the binder-platform in the act of sweeping the grain off the harvester-table onto the said platform, will strike the lever A⁴, thus sliding the shaft U inward in its bearings, throwing the clutches Y and Z into gear and starting the binder mechanism. In this position the shaft U is retained by the action of a spring-actuated arm, E⁴, mounted or formed upon the end of a short shaft, F⁴, which is journaled upon the binder-platform, and the other end of which is provided with a short arm, G⁴, adapted to engage a stud, H⁴, extending laterally from one of the carrier-slides or cross-heads P'. The carrier-slides, by the action of the mechanism which is thrown into gear by the lever A⁴, are moved to the rear end of the binder-platform and back, when, on their return, the stud H⁴ will strike the arm G⁴, thus throwing the arm F⁴ out of engagement with the lever X³, when the shaft U will be moved in an outward direction by the action of a suitably-arranged spring, 1⁴, thereby throwing the clutches Y Z out of gear and stopping the binding mechanism until it shall be thrown into gear again by one of the rake-arms coming into contact with the lever A⁴.

J⁴ is a grain-guide arranged in an inclined position upon the inner side of the binder-platform and serving to guide the grain to its proper position when it is being swept by the rake from the harvester-table onto the binder-platform; and K⁴ is a butt-board pivoted to the opposite side of the platform and having a rod, L⁴, leading to the driver's seat, and by means of which it may be adjusted so as to cause grain of different lengths to be placed evenly upon the middle of the platform.

Hinged upon the rear end of the binder-platform, directly above the transverse shaft L², is a board, M⁴, which is normally held in an upright or vertical position by the action of a suitably-arranged spring, N⁴. The upper edge of the said board is provided with one or more notches, O⁴, adapted when the said board is lowered to accommodate the compressor arm or arms O² of the shaft M². When the grain is pushed in a rearward direction upon the binder-platform by the carriers O′, the said board M⁴ will yield and the bundle of grain will rest on top thereof while being compressed by the arms O². As soon as the bundle has been tied and is ejected from the platform by the arms C³ upon the knotter-shaft K², the board M⁴ will rise and assume its normal vertical position, in which it will serve to arrest the rearward movement of the grain upon the platform until the arms O² again rise for the purpose of forming, compressing, and holding another bundle.

From the foregoing description, taken in connection with the drawings hereto annexed, the operation and advantages of this invention will be readily understood by those skilled in the art to which it appertains.

The cutting mechanism of the harvester, which is not shown in the drawings, is of ordinary construction, and motion is transmitted from it to the rake, the arms of which serve to throw the binding mechanism into gear by coming into contact with the lever A⁴, as described. As soon as the clutches Y Z are thrown into gear, the chain K′ will start, thus causing the carriers O′ to travel in a rearward direction upon the binder-platform in the slots N′ of the latter. The grain which has been swept onto the binder-platform by the rake-arm which has started the binding mechanism is thus forced toward the tail end of the platform and onto the board M⁴, which is lowered by the pressure of the grain. In the meantime a rotary motion has been communicated to the shaft K², which revolves slowly in the direction indicated by an arrow, throwing the stripper-arms C³ in an outward or rearward direction. When the carrier-slide comes in contact with the lever V³, the rock-shafts L² and M² are oscillated in their bearings, thus compressing the bundle between the arms O² O². One of the arms O² of the shaft L² will pass and engage the beveled latch D³, which latter, being retained by the stud or stop G³, will serve to retain the arms O² in a raised position, compressing the bundle, and thereby take all the strain off the carriers O′ and off the mechanism by which the said carriers are operated, thus throwing all the available power off the carrier and, through the intermediate connecting mechanism, onto the knotter-shaft K², which actuates mechanism for tying the bundle, which mechanism, being no part of my present invention, has not been shown in the drawings. The carriers O′ in the meantime have commenced their travel in a forward direction upon the platform, and the shaft K² continues its revolving motion until one of the ejector-arms C³ comes into contact with the latch D³, between the outer end against which the arm O² is bearing and the edge of the plate X², and presses the latch and arm O² back until it thereby releases the arm O², thus permitting the shafts L² M², actuated by the spring R³, to return to their normal position. The ejectors C³ now shove the sheaf off the binder-platform, thus permitting the board M⁴ to rise to its normal position; and the carriers O′, on reaching the front end of the binder-platform, will disengage the arm F⁴ from the lever X³, thus throwing the binding mechanism out of gear and suffering it to so remain until it is again thrown into action by one of the rake-arms.

Having thus described my invention, I claim and desire to secure by Letters Patent of the United States—

1. In a grain-binder, the combination of the binder-platform secured to the side of the grain-platform, suitable brackets or frames at the rear end of the same, a transverse beam connecting the upper rear corners of the said brackets or frames, a truss connected to the ends of the said beam and having its ends connected to the under side of the rear end of the platform, and a downwardly and forwardly extending beam or stringer connecting the apex of the said truss with the rear end of the tongue, said stringer being directly over and extending lengthwise of the binder-platform, substantially as herein described, for the purpose set forth.

2. In a grain-binder, the combination of the binder-platform, a bracket extending forwardly from the same, the tongue secured upon the said bracket, a brace connecting the side of the tongue with the front end of the platform, an axle mounted in said bracket and brace, a drive-wheel mounted upon the said axle, and a balance-weight secured upon the front end of the tongue, substantially as and for the purpose herein set forth.

3. In a grain-binder, the combination of the binder-platform, the tongue secured to the front end of the same, substantially as described, and having a balance-weight, an axle mounted transversely in a bracket and a brace connecting the tongue to the platform, a drive-wheel mounted upon the said axle, a yoke or upright mounted pivotally upon the said axle, a transverse truss at the rear end of the binder-platform, a longitudinal truss connecting the apex of said transverse truss with the tongue and resting at its apex upon the yoke or upright pivoted upon the axle of the drive-wheel, and a longitudinal beam or stringer connnecting the rear end of the tongue with the apex of the rear transverse truss, substantially as and for the purpose set forth.

4. In a grain-binder, the combination of the binder-platform, the transverse truss at the rear end of the same, the tongue secured at the front end of the said platform, and a longitudinal beam or stringer hinged to the rear end of the tongue and engaging with the apex of the rear transverse truss, substantially as and for the purpose herein set forth.

5. The combination of the binder-platform, the transverse truss at the rear end of the same, the tongue secured at the front end of the said platform, the drive-wheel, the yoke or upright pivoted upon the axle of the same, the longitudinal stringer-beam, and the longitudinal truss having an interposed spring, all arranged and operating substantially as and for the purpose set forth.

6. The combination of the binder-platform, the tongue secured at the front end of the same, the drive-wheel axle, a yoke or upright mounted pivotally upon the latter, and a brace secured to one side of said yoke or upright and connected at its ends to the side of the tongue and to the front end of the binder-platform, respectively, substantially as and for the purpose herein set forth.

7. The combination of the longitudinally-slotted binder-platform, the grain-carriers arranged to slide in said slots and having cross-heads, the under sides of which are provided with downwardly-extending lugs at their front and rear ends, longitudinal bolts arranged in the said lugs, a cross-piece or brace arranged to slide upon said bolts, coiled springs arranged to force the said cross-piece in a forward direction, and a pivoted rod connecting the said cross-piece with a drive-chain arranged to run over horizontal chain-wheels journaled under the binder-platform near the front and rear ends of the latter, substantially as and for the purpose herein set forth.

8. In a grain-binder, the combination of the longitudinally-slotted platform, a horizontal drive-chain arranged longitudinally under the binder-platform, and the longitudinally sliding or reciprocating grain-carriers connected to and operated by the said drive-chain and capable of having a longitudinal motion independent of their connection with the said chain, substantially as herein described, for the purpose set forth.

9. In a grain-binder, the combination of the platform, frames or brackets at the rear corners of the same, a transverse beam connecting the upper rear corners of the said brackets, uprights at the front end of the said platform, a pair of longitudinal beams secured to the said uprights, a plate connecting the rear ends of the said beams with the transverse beam at the rear end of the platform, and brackets extending laterally from the said longitudinal beams and supporting an inclined guide, substantially as and for the purpose set forth.

10. The combination of the binder-platform, frames or brackets at the rear corners of the same, a transverse beam connecting the rear corners of the said brackets, the longitudinal beams supported above the binder-platform, a longitudinally-sliding rod attached to one of the said longitudinal beams and having its rear end connected pivotally with a cord-guide pivoted to the rear transverse beam, a pivoted downwardly-extending arm attached to the front end of the said longitudinally-sliding rod, a spring arranged to hold the said arm in position, and the longitudinally-reciprocating grain-carriers arranged to actuate the sliding rod by contact with the downwardly-extending arm of the latter, substantially as and for the purpose herein set forth.

11. The binding-cord guide consisting of a bent lever pivoted to a transverse beam at the rear end of the binder-platform and having an arm bifurcated at its lower end, in combination with the longitudinally-sliding operating-rod having a downwardly-extending pivoted arm, a spring arranged to hold the said arm in place, and the longitudinally-reciprocating grain-carriers, said arm having an independent longitudinal motion with relation to the drive-chain with which said carriers are connected and by which they are operated, substantially as herein shown and described.

12. In a grain-binder, the combination of the parallel rock-shafts having toothed segments engaging each other and provided with curved compressor-arms, a radial arm extending downwardly from one of the said shafts, a tension-spring connecting said arm with the rear end of the under side of the platform, a lever pivoted to the under side of the platform and having an arm extending under one of a series of longitudinal slots in the same, a link connecting the other end of said lever with the arm extending downwardly from the compressor rock-shaft, and the longitudinally reciprocating grain-carriers adapted to engage the said lever and thereby actuate the compressor-shafts, substantially as herein described, for the purpose set forth.

13. The combination of the binder-platform, a transverse beam supported above the rear end of the latter, a pair of longitudinal beams supported above the platform, a plate connecting the rear ends of said longitudinal beams with the transverse beam, a spring-actuated beveled latch extending from the side of said plate, a stud arranged to limit the forward movement of said latch, the transverse rock-shafts having compressor-arms, one of which is adapted to engage and be retained by the said latch, and suitable operating mechanism, substantially as and for the purpose herein set forth.

14. The combination of the transverse rock-shafts having toothed segments engaging each other and provided with radially-extending compressor-arms, a spring-actuated latch arranged to be engaged by one of the compressor-arms and thereby retain the several arms in a raised or operative position, the revolving knotter-shaft having radially-extending ejector-arms, one of which is adapted to engage the latch and thereby to release the compressor-arms, and suitable operating mechanism, substantially as herein described, for the purpose set forth.

15. The combination of the longitudinally-slotted platform, the longitudinally-reciprocating grain-carriers, the drive-chain connected with and adapted to operate the said carriers, the transverse rock-shafts having the radially-extending compressor-arms, and adapted to be operated by the longitudinally-reciprocating carriers, the revolving knotter-shaft, mechanism connecting said knotter-shaft with the drive-chain of the grain-carriers, whereby it is operated, mechanism for retaining the compressor-arms when lifted in their raised or operative position, so that the whole power of the drive-chain shall be transmitted to the knotter-shaft, and mechanism for releasing the compressor-arms automatically when the bundle has been tied, substantially as and for the purpose herein set forth.

16. The combination of the transverse parallel rock-shafts having the compressor-arms, the needle hinged or pivoted to an arm extending radially from one of the said shafts, a radially-extending arm at the outer end of the said shaft, and a cord connecting the said arm with the heel of the needle, said cord passing through suitable eyes or guides and being provided with an interposed spring, substantially as and for the purpose herein set forth.

17. The combination of the binder-platform, the longitudinally-reciprocating grain-carriers, the transverse rock-shafts at the rear end of the binder-platform having the compressor-arms, the transversely-arranged vertical hinged board, a spring arranged to retain the latter normally in a raised or vertical position, the revolving knotter-shaft having the ejector-arms, and suitable operating mechanism, all arranged and operating substantially as and for the purpose herein shown and specified.

18. In a grain-binder, the combination of the drive-chain arranged to operate the longitudinally-reciprocating grain-carriers and the binding mechanism, mechanism connecting one of the shafts of said drive-chain with a pinion mounted on one end of a tubular shaft and having a clutch, a shaft arranged to slide within the said tubular shaft and having a clutch adapted to engage the clutch-pinion of the latter, a box journaled on one end of said sliding shaft, a lever pivoted to an upright and connected pivotally with the said box, a suitably-arranged vertical lever, a rod connecting the lower end of the latter with the horizontal lever, the harvester-rake having arms adapted to strike or engage the upper arm of said vertical lever, and a chain connecting a chain-wheel upon the sliding shaft with a chain-wheel upon the drive-wheel of the binder, whereby the operating mechanism of the binder shall be thrown into gear by contact of one of the rake-arms with the upper end of the upright lever, substantially as set forth.

19. The combination of a transversely-sliding shaft connected with the drive-wheel of the binder and having a clutch through which motion may be transmitted to the operating mechanism of the binder, a lever suitably connected with the said shaft and adapted to throw it into gear by contact with one of the arms of the harvester-rake, a spring arranged to throw the said shaft out of gear automatically, a catch arranged to engage a lever connected with said shaft and retain it in or out of gear, and the longitudinally-reciprocating grain-carriers adapted to actuate the said catch, substantially as herein described, for the purpose shown and specified.

In testimony that I claim the foregoing as my own I have hereunto affixed my signature in presence of two witnesses.

CHARLES MILLER.

Witnesses:
JOHN C. WILSON,
GERRIT LOUGHBOROUGH.